United States Patent [19]
Sekissov et al.

[11] Patent Number: 5,942,098
[45] Date of Patent: Aug. 24, 1999

[54] METHOD OF TREATMENT OF WATER AND METHOD AND COMPOSITION FOR RECOVERY OF PRECIOUS METAL

[75] Inventors: Artuor Sekissov, Las Vegas, Nev.; Aramais Paronyan, Los Angeles, Calif.; Vladimir Kouzin, Las Vegas, Nev.; Natella Lalabekyan, Los Angeles, Calif.

[73] Assignee: Technologies Unlimited, Inc., Los Angeles, Calif.

[21] Appl. No.: 08/631,473

[22] Filed: Apr. 12, 1996

[51] Int. Cl.⁶ .................................. C25B 1/00; C25C 1/20
[52] U.S. Cl. ........................ 205/565; 205/687; 205/746; 205/770
[58] Field of Search .................................. 205/565, 687, 205/703, 742, 748, 746, 770

[56] References Cited

U.S. PATENT DOCUMENTS

| | | | |
|---|---|---|---|
| 3,616,333 | 10/1971 | Farmakides | 204/128 |
| 3,639,925 | 2/1972 | Scheiner | 75/101 R |
| 3,883,412 | 5/1975 | Jensen | 204/149 |
| 3,896,013 | 7/1975 | Zievers | 204/149 |
| 3,910,636 | 10/1975 | Hard | 299/5 |
| 4,107,008 | 8/1978 | Horvath | 204/129 |
| 4,293,395 | 10/1981 | Iijima et al. | 204/98 |
| 4,295,944 | 10/1981 | Satoh et al. | 204/98 |
| 4,342,592 | 8/1982 | Lamb | 75/118 R |
| 4,439,235 | 3/1984 | Simpson | 75/101 R |
| 4,557,759 | 12/1985 | McGrew et al. | 75/118 R |
| 4,576,812 | 3/1986 | von Hahn | 423/491 |
| 4,592,779 | 6/1986 | Russ et al. | 75/101 R |
| 4,723,998 | 2/1988 | O'Neil | 75/101 R |
| 4,734,171 | 3/1988 | Murphy | 204/111 |
| 4,752,412 | 6/1988 | Van Antwerp et al. | 252/186.22 |
| 4,902,344 | 2/1990 | Lucas et al. | 75/101 R |
| 4,957,610 | 9/1990 | Hawkins | 204/129 |
| 4,997,532 | 3/1991 | Flax | 204/105 R |
| 5,169,503 | 12/1992 | Baughman et al. | 204/105 R |
| 5,186,794 | 2/1993 | Parker et al. | 204/98 |
| 5,328,669 | 7/1994 | Han et al. | 423/32 |
| 5,466,347 | 11/1995 | Shimamune et al. | 204/98 |
| 5,730,856 | 3/1998 | Omasa | 205/742 |

Primary Examiner—Donald R. Valentine
Attorney, Agent, or Firm—Ladas & Parry

[57] ABSTRACT

The invention provides a composition for use in the recovery of precious metals, or the treatment and/or purification of water, the composition being selected from a catolytic solution having a pH greater than 7, an anolytic solution having a pH less than 7, and a near-neutral solution having a pH near 7, or a mixture of two or more of said solutions. The invention also relates to a process for the recovery of precious metals from precious metal-bearing ore using the above composition. Further, there is provided a process for making a composition, the process comprising activating water by subjecting it to a magnetic treatment; subjecting the water to electrolysis in a reactor; introducing additives to the activated water in the reactor to form a reaction mixture; subjecting the reaction mixture to photoelectrolysis and/or radioelectrolysis; and separating an anolyte and catholyte in the reactor.

52 Claims, 3 Drawing Sheets

METHOD OF TREATMENT OF WATER AND METHOD AND COMPOSITION FOR RECOVERY OF PRECIOUS METAL

BACKGROUND OF THE INVENTION

This invention generally relates to processes and compositions for the extraction and/or recovery of precious metal contained in precious metal-bearing materials or ores. The invention also relates to treatment and purification of water. Generally, the term "precious metals" is intended to cover a wide range of valuable metals, including, but not limited to, silver, gold, platinum group elements, molybdenum, copper and zinc.

Conventional methods of precious ore extraction are already well known. Thus, the prior art teaches extraction of such metals from naturally occurring ore, either in situ or after the ore has been mined. Leaching with the use of chloride and hypochlorite ions is a well known method for extracting precious metals from ores.

With respect to gold, there are generally three main forms of this precious metal which occur in nature. In this document, "gold" is intended to include such metals as platinum, iridium, rhodium, ruthenium, palladium, silver, osmium and other metals. The first form of gold comprises free gold particles within the ore, while the second includes gold as part of a compound with other minerals in the ore. A third type of gold is sometimes referred to as "incorporated gold", where the atoms of gold are incorporated, for example, in a quartz lattice between atoms of silica and oxygen. Thus, microparticles of gold may be incorporated into a mineral such as quartz, and this form of gold cannot easily be recovered or released. The gold in this category may also be dispersed as a colloid, namely, a system of gold atoms in a crystal lattice. Isomorphic gold, comprising individual gold atoms in the points of lattice is yet a further form of incorporated gold. The last three forms of gold in the category of incorporated with other mineral particles are extremely difficult to extract.

The prior art shows numerous examples showing different methods for extraction of metals from ore. U.S. Pat. No. 3,910,636 (Hard) generally describes a process of in situ mining which requires the drilling of a well into an underground ore deposit, and thereafter introducing a leach solution to contact the ore. The leach solution dissolves the mineral within the ore deposit, and the pregnant solution is recovered and processed for the purpose of obtaining the particular mineral dissolved therein.

U.S. Pat. No. 4,342,592 (Lamb) generally describes the production of silver or gold by processing silver- or gold-bearing ore with solutions containing chloride and hypochlorite ions. Further, the chloride/hypochlorite solution may be regenerated electrochemically and reused, rather than being discharged. The process, which is stated to have a non-polluting effect, has three basic steps, namely, metal solubilization, metal recovery and solution regeneration.

U.S. Pat. No. 4,439,235 (Simpson) discloses a chlorination process which can, in a relatively short period of time and without using cyanide compounds, solubilize gold, silver and other precious metals contained within oxide, sulfide and carbonaceous ore. In this patent, the process involves comminuted ore contacted first with an acidic primary leach solution and then with a basic secondary leach solution. In the process, hydrochloric acid is used as a catalyst.

U.S. Pat. No. 4,557,759 (McGrew) teaches the use of an iodine leach for the dissolution of gold. Gold is recovered from gold ores by oxidation with iodine and complexation with iodide in an aqueous, electrically conductive leach or lexiviant. U.S. Pat. No. 4,734,171 also describes gold recovery by iodide/iodine leaching with the pregnant lexiviant containing solubilized gold and iodine being treated in an electrolytic cell to reduce gold in solution to elemental gold.

Several other patents also show the chlorination of metals including the use thereof for recovery of the metal. U.S. Pat. No. 4,567,812 (von Hahn) makes the chloride of the metal from the sulfide of that metal through a number of steps, and recovery of the metal chloride from an aggregate mixture produced by the process. U.S. Pat. No. 4,723,998 (O'Neil) teaches gold recovery from ores through extraction by a procedure involving a simultaneous chlorine leach and ion exchange resin adsorption procedure. U.S. Pat. No. 5,169,503 (Baughman) teaches the solubilization of metal values by a lexiviant comprising an aqueous solution of chloride salt and hypochlorite salt. U.S. Pat. No. 5,328,669 (Han) also attempts to extract metals from their ores while avoiding the use of cyanide or strong acids. The method of this patent teaches charging to a reaction zone the precious-metal-bearing materials, water, either a halide or an elemental halogen, and ammonium ions as a leaching solution. Separation and recovery steps for the precious metal-ion-solution follow.

U.S. Pat. No. 4,592,779 (Russ) attempts to recover a higher percentage by weight of precious metals from raw ores including treatment with an aqueous basic solution having a pH in the range of about 12 to about 14. The basic solution may contain an alkali metal or alkaline earth metal hydroxide, such as sodium hydroxide. After treatment with the aqueous basic solution, suspended precious metals are separated by conventional methods such as carbon absorption, electrowinning or precipitation.

U.S. Pat. No. 4,752,412 (van Antwerp) describes a slurry including the formation of "activated oxygen" comprising hydroxyl (OH), atomic oxygen, hydrogen peroxide, hydrogen dioxide ($HO_2$) and hydrogen peroxide dimers and trimers, as well as ozone.

SUMMARY OF THE INVENTION

Accordingly, one aspect of the present invention may provide one or more compositions, to be used individually or in various combinations, the compositions enhancing the recovery of precious metal from precious metal-bearing materials. In another aspect, the invention provides a process whereby the compositions, used alone or in combination, are applied to the precious metal-bearing materials under conditions which enhance precious metal recovery therefrom. The invention also provides for a process for making the compositions. The invention further provides a process for treating and/or purifying water.

According to one aspect of the invention, there is provided a composition for use in the recovery of precious metals, the compositions being selected from a catholytic solution having a pH greater than 7, an anolytic solution having a pH less than 7, and a near-neutral solution having a pH near 7, or a mixture of two or more said solutions. The composition may also be used in the treatment and/or purification of water.

According to another aspect of the invention, there is provided a process for the recovery of precious metals from precious metal-bearing material, the process comprising: a) applying to the material a solution selected from the group consisting of a catholytic (basic) solution, an anolytic (acidic) solution, a bi-electrolytic (semi-neutral) solution, and a mixture of two or more of said solutions; and b) separating the precious metal dissolved by the solutions from the precious metal-bearing material. The process may also be used in the treatment and/or purification of water.

According to yet a further aspect of the invention, there is provided a process for making a composition for use in the recovery of precious metals, the process comprising: a) activating water by subjecting it to a magnetic treatment; b) subjecting the water to electrolysis in a reactor; c) introducing additives to the activated water in the reactor to form a reaction mixture; d) subjecting the reaction mixture to photoelectrolysis and/or radioelectrolysis; and e) separating an anolyte and catholyte in the reactor. The process may also be used in the treatment and/or purification of water.

The invention may comprise three solutions, including a catholytic solution generally having a pH greater than 7, an anolytic solution generally having a pH less than 7, and a bi-electrode or near neutral solution with a pH which may be less or greater than 7. These three solutions are used individually or in combination according to the ore-type, type of precious metal to be extracted, and also depending upon the manner in which the precious metal is located in the ore. The three solutions, when used in the treatment and/or purification of water, are used individually or in combination according to the nature of the water being treated. The three solutions are all preferably comprised of water and/or activated water containing low concentrations of reagents which impart to the solution the catalytic, oxidizing and complex-forming characteristics. Such reagents are generally the result of electrolysis and photoelectrolysis.

The solutions may be prepared by providing a source of water and conduit means for conveying the water to reactors or electrolizers, including an anode, cathode and a membrane. The electrolizers may include photo-electrolysis means, preferably in the form of ultraviolet lamps, for treating the solution photoelectrolytically. Prior to introduction of the water to the electrolyzers, the water may be activated by subjecting it to a magnetic treatment. After the water has been activated, it is conducted to one or more electrolizers. In a first electrolyzer, an anode and cathode, separated by a membrane, and including the ultraviolet lamps or other UV source, electrolyze the water, which is separated into an anolyte and a catholyte. The anolyte and catholyte respectively may be removed to separate chambers. Thereafter, an additive such as NaCl is introduced. The anolyte, stored in a tank or chamber, may contain molecular and/or atomic chlorine, oxygen, ozone, water, activated water, chlorine ions, hydrochloric acid and hydrogen peroxide. The catholyte, stored in a separate tank, may contain such constituents as hydrogen, hydroxyl ions, water, activated water, chlorine ions, and sodium hydroxide.

In a second or independent electrolyzer, preferably an electrolyzer having no membrane, the activated water may be subjected to a further electrolytic and magnetic treatment, and sodium chloride may then be added. The near-neutral solution produced thereby may be categorized as a bi-electrode solution, and may contain such constituents as hypochlorites, (for example, NaClO), NaOH, molecular chlorine, chlorine ion and sodium chloride. It should be noted, however, that all solutions may be prepared and stored in the same reactors or electrolyzers, adapted as appropriate.

The three separate solutions, namely, the anolyte, catholyte and bi-electrode solutions, each have different characteristics, and may be used individually or in combination.

One or more of the solutions may be first placed in contact with the ore (or the water being treated), either in situ or after mining once the ore has been placed in appropriate treatment chambers. The ore and solution(s) may be mixed, and the mixture may be crushed in a miller to produce a fine grained product. Thereafter, the crushed ore or mixture may be further treated with one or more of the three solutions. The concentration of these solutions may be different according to need, in order to facilitate recovery of precious metals. In crushing the ore, a wet or dry grinding process may be followed.

The second or subsequent addition of solution, possibly in different concentration, has a leaching effect whereby the precious metal may be separated from the precious metal-bearing material. Usually, the solutions in the second or subsequent addition after crushing and grinding for leaching of the material, and solution will be more concentrated than the solution used in the first application. The metal can be recovered by electrowinning, ionic exchange, extraction, sorption, electrosorption, or by any other means, preferably near the electrode zone. Alternatively, the precious metal may be recovered from the dried mixture by smelting or amalgamation, and this would typically be a viable option if the concentration of the precious metal within the ore is sufficiently high.

One of the advantageous features of the invention is that the particular ore may be treated with varying combinations of the anolyte, catholyte and bi-electrode solutions. In this regard, the particular combination, including the concentration and relative proportions of each solution, can be tailored to the type of ore, precious metal being extracted, as well as the way in which the precious metal is contained within the ore.

There are four basic ore types. Each type requires one, two or all three solutions to be used. Ore with visual gold usually needs to be treated with the bi-electrode solution (sodium hypochlorite). Carbonate ore typically requires the basic (catholytic) solution alone or with the bi-electrode solution. Clay rich, non-carbonate ore would be treated with the acidic (anolithic) solution alone or with the bi-electrode solution. Finally, mixed ore would require all three solutions to be applied together.

Once the solutions have been prepared, in the manner discussed above, the solutions are maintained in special protective tanks. Preferably, the solution should be used soon, preferably within 5–6 hours.

In preparing the solutions in the electrolyzers, it is preferable that the electrodes should be comprised of metallic grating. This facilitates further activation of the water molecules near the surface between the water and electrodes as well as the water-reactor boundaries. The ion exchange between lower and upper parts of the reactor will occur by convectional motion through the perforated walls. Temperature conditions may be adjusted in the electrolyzer to thereby increase molecular energy, and optimize the reaction time and effects. The electrodes may be in parallel and opposite orientation (see FIG. 2) within the electrolyzer. Parallel electrodes having an opposite orientation may be advantageous by creating interorthogonal direction of the ion flow.

DETAILED DESCRIPTION OF THE PREFERRED EMBODIMENT

The invention is a composition and process, using hydrometallurgic and pyrometallurgic techniques, for the recovery of precious metals from ores or other metal-bearing mineral materials. The metal-bearing mineral materials may also be comprised of ore tailings or discard and lower quality ores, (subconditioned ore) and the like. These ores are treated using solutions of the invention which are produced by creating magnetized water and applying electrolytic and/or photoelectrolytic techniques. The invention is also a composition and process, using such techniques, for treatment and purification of water.

Ore and other precious metal containing materials can often be subdivided into a number of types according to their microstructure characteristics. For example, a number of forms of gold occur naturally. Gold may be found in free particle form, or formed as a compound with other minerals. Further, the gold may be incorporated into other mineral particles such as, for example, in the case of sulfide gold ore. In this case, disperse or colloid gold is concentrated in $CuFeS_2$ and $FeS_2$. Lastly, gold may be available as individual atoms as a form of isomorphic gold. It is generally easier to extract and recover gold when it exists as free particles, when it is in compound with other minerals, or when it comprises a micromineral within a mineral. However, disperse or colloid gold, wherein the gold atoms are contained within a crystal lattice, as well as isomorphic gold, are extremely difficult to extract. The present invention facilitates improved extraction recovery of gold in these forms. All forms of the gold mentioned above can be extracted by the composition and process of the present invention. While the composition and method may be particularly well suited for the gold which is incorporated in other mineral particles, it will work with gold in its other forms.

It is generally understood at this time that interatomic interactions in the solid state and in liquid are the result of quantum-mechanical transformation of valent electronic shells of the atoms into one common electronic orbit. In this model, atomic nuclei are thought to be an inert electric framework. However, within the atomic nuclei, there are processes of interchangeable transformation of protons and neutrons, as well as a constantly changing position of these protons and neutrons relative to each other, and these influence the motion of the electrons, and hence the interatomic interactions. It is also believed that these intranuclear processes have a significant effect on interatomic interaction in complex-forming elements which include precious metals. In this regard, the particular features of the nuclear structure of the atoms of the complex-forming elements including the precious metal are important.

Precious metals have a tendency to form compounds based not on the structure of their electronic shells. Examples of such compounds include $AuCl_{-4}$, $PtCl_{-4}$, and the like. The relationship between the chemical properties of the atoms in the complex-forming elements, and the structure of the atomic nucleus, can to some extent be illustrated by the divisibility of their charge numbers, namely, the number of protons in the nucleus. Thus, an example of natural associations of ore elements is the following:

Mo(42)-Sn(50)-2Cu(29)-2As(33)-W(74)-Pb(82)-3Zn(30)

It will be noted that each of the above in this sequence differs or shifts from the preceding element by the nuclear number 8. In addition to the above, there are other natural associations of complex-forming elements where the charge number is shifted by 1, 2, etc. Examples of complex-forming elements shifted by the number 1 are as follows:

Au(79)-Pt(78)-Ir(77)-Os(76)

and

Ag(47)-Pd(46)-Rh(45)-Ru44)

As will be noted, the associations are generally determined by the position of the element within the periodic table of elements, and these associations are not formed on the basis of many other chemical properties.

The process of dissolution of precious metals on the atomic-subatomic level is mainly the result of electric-internuclear interreaction of their atoms with the atoms of the solvent. This solvent may include hydrogen and oxygen. More particularly, the dissolution of the precious metals can be represented as the result of an equivalent or additive charge effect of the atoms of a solvent on the atom of gold and its bonds within the lattice in which the gold is located in the ore. The following examples are illustrations of this effect:

For copper:

H(1)+Cl(17)+3H(1)O(8)→Cu(29)

For silver:

2[H(1)+Cl(17)]+3H(1)O(8)→Ag(47)

For gold:

2[H(1)+Cl(17)]+3H(1)O(8)+H(1)N(7)30(8)→Au(79)

It is also known that just about the only solvent which will assist in the recovery of gold is the combination of nitric acid and hydrochloric acid. From a practical point of view, gold cannot be dissolved by any one of these acids alone. On the other hand, nitric acid or hydrochloric acid alone is able to dissolve both copper and silver.

In the formula set out below, the processes for dissolving gold and silver by cyanides are illustrated:

For silver:

H(1)+C(6)N(7)+Na(11)C(6)N(7)+O(8)H(1)→Ag(47)

For gold:

H(1)+C(6)N(7)+Na(11)C(6)N(7)+O(8)H(1)+2[O(8)]2→Au(79)

The process set forth above proceeds in an alkaline solution. (This alkaline solution is in the form of sodium cyanide).

Gold and silver can also be dissolved by thiourina, CS[NH2]2. This process can be illustrated by the following formula:

For silver:

C(6)S(16)[N(7)2H(1)]+2[N(7)H(1)]→Ag(47)

For gold:

2[C(6)S(16)N(7)2H(1)]+N(7) H(1)+N(7)2H(1)→Au(79)

A further process for the dissolution of gold and silver is by the use of hypochlorites in alkaline, acidic, and neutral solutions. For example, sodium hypochlorite in conjunction with such solutions are illustrated by formulae as follows:

$$NaClO+|H(\text{acidic solution})$$

$$|OH(\text{alkaline solution})$$

$$|HOH(\text{neutral solution})$$

Once more, with respect to silver and gold, the following formulae illustrate the process:

For silver:

$$Na(11)Cl(17)O(8)+Na(11) \rightarrow Ag(47)$$

for gold:

$$Na(11)+2[Cl(17)O(8)]+2[O(8)H(1)] \rightarrow Au(79)$$

It has been found that in the alkaline solution, without the complex-forming sodium chlorite, the last reaction noted above is slow, and this could be due to the presence of like charges in turn inhibiting ions from approaching closely to each other.

In a neutral or near neutral, near-equilibrium condition solution, the process of dissolution of gold by hypochlorites is significantly faster. In this case, ions of opposite charge provide positioning in the nuclei which has the preferred divisibility, as discussed above.

The dissolution of gold and other precious metals using solutions of hypochlorites and chlorites has definite ecological and economic advantages. Conventional well-known methods for the dissolution and desorption of gold particularly involve not only the use of strong acids (such as hydrochloric and nitric acids), but also the use of cyanide compounds. The fundamental principle of the extraction techniques which form the basis of this invention is the influence of basically neutral atoms of chlorine and oxygen on the atoms of gold. These atoms permit localization thereof in small spaces which are comparable with the atomic radius of these atoms. The following formula exemplifies the chemistry of this recovery technique:

$$2H(1)+2[O(8)]H(1)+3Cl(17)+O(8) \rightarrow Au(79)$$

The above is the preferred process, although the following formula also illustrates acceptable chemistry in terms of the invention:

$$3H(1)+Cl(17)+2[Cl(17)O(8)]+O(8)H(1) \rightarrow Au(79)$$

Based on the calculation of the charge numbers, it is to be noted that Cl17 corresponds to 20(8)+H(1)[OH+O], and Na11 corresponds to 3H (1)+to (8). The effect of passing the water through a magnetic field to provide activated water before the electrolysis is to stabilize the "structure memory" of the water. Moreover, a transition of ions of chlorine and oxygen into the atomic state can be achieved by short term treatment of the solutions being produced by ultraviolet rays, during electrolysis.

Figure 1:
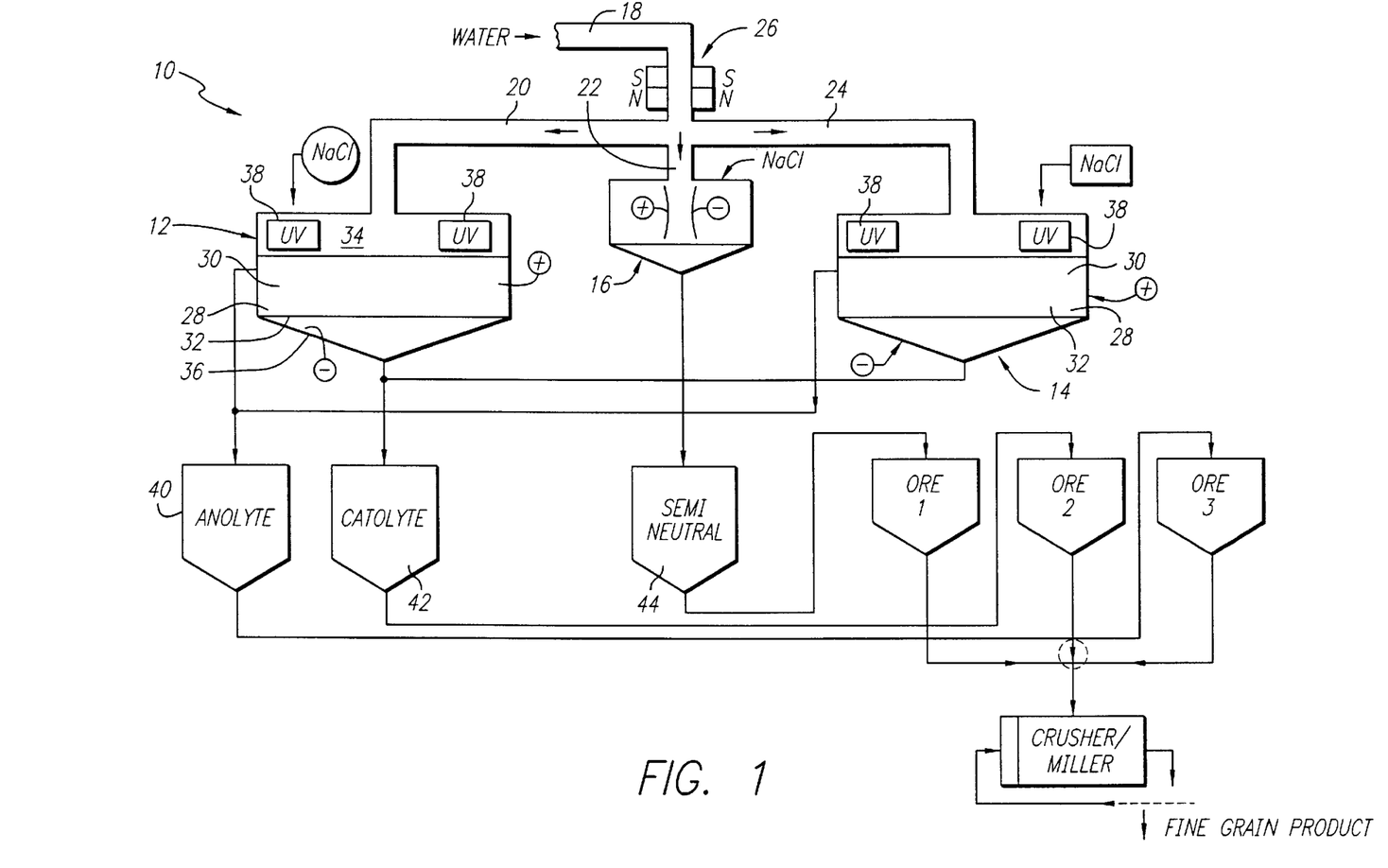
FIG. 1 shows in diagrammatic form the treatment system including preparation of solutions and the use thereof to treat the ore or water.

With reference to FIG. 1 of the drawings, there is shown a recovery system 10 which includes apparatus for production of various solutions used in the invention, and the application of such solutions to the precious metal-bearing ore. The recovery system 10, or treatment system, can be used in the purification and/or treatment of water. The system 10 includes a first reactor or electrolyzer 12, a second reactor or electrolyzer 14 which is substantially identical to first electrolyzer 12, and a third electrolyzer 16.

A water source (not shown) supplies water through a pipe 18, the pipe 18 branching into three conduits 20, 22 and 24. The conduit 20 supplies water to the first electrolizer 12, conduit 22 to the third electrolyzer 16, and conduit 24 to the second electrolyzer 14. Each electrolyzer 12 and 14 is preferably comprised of a leakproof container with electrodes. Further, it is designed to load and discharge water (electrolytic solution), sodium chloride, and to permit the UV light source to facilitate UV light treatment within the electrolyzer. Prior to branching, the water is subjected to magnetic treatment by magnet 26, so that the water entering the conduits 20, 22 and 24 has been at least partially activated. The first and second electrolyzers 12 and 14 are of substantially identical structure. Each electrolyzer 12 and 14 comprises a membrane, an anode 30 and a cathode 32. The perforated wall 28 divides the electrolyzer into an upper compartment 34 and a lower compartment 36, and ultraviolet light 38 is provided in each of these electrolyzers in the upper compartment 34.

Prior to adding the NaCl, the water must be activated, and by activation is meant one or more of the following steps:
  a) treatment by a magnetic field;
  b) treatment by UV light;
  c) treatment by an electric field; and
  d) possible treatment by Beta rays, Gamma rays, and X-rays.

An appropriate membrane is needed to separate the positively charged ions from the anions, and accumulate anolyte near the anode and catholyte near the cathode. This will allow the two types of solution (anolytic and catholytic) to be produced in the same electrolytic apparatus. Sometimes, a zero potential electrode can be used instead of a membrane, in which case only ions of the same sign will accumulate near the opposite electrode. In the case of bi-electrode electrolysis, shown as electrolizer 16 in FIG. 1, the membrane is absent. In this case, the electrodes may be designed so that they work in a liquid-plasma (shock-spark) regime in the upper part, and the regular electrolysis regime is in the lower part.

In each of electrolyzers 12, 14 and 16, particularly where the invention is used for the treatment of precious-bearing materials, sodium chloride (NaCl) is added to the activated water, preferably after it has undergone substantial electrolysis, and the solution is subjected to further electrolysis and UV-treatment (photoelectrolysis). The anolyte and catholyte are separated in these electrolyzers by the membranes.

In a preferred embodiment, before NaCl is added, the water is stored in a tank for at least 0.5 hours prior to its use and magnetic treatment. The water is treated in the magnetic field having a potential not less than 100 m Tesla prior to its introduction into the electrolyzers or other reactors. The velocity of the water traveling through the pipes should be at least 0.3 meters per second. The water is treated in an electric field for about 10–20 minutes. During this electrolysis, three types of solutions are produced. These solutions are as follows:
  a) an anolitic (acidic) solution: activated water, O, $O_2$, $H_2O_2$, $H_3O$ (H);
  b) a catholytic (basic) solution: activated water and hydroxyl ion (OH); and
  c) a bi-electrolytic (semi-neutral) solution: activated water, OH, cation H and ($H_3O$).

Figure 2:
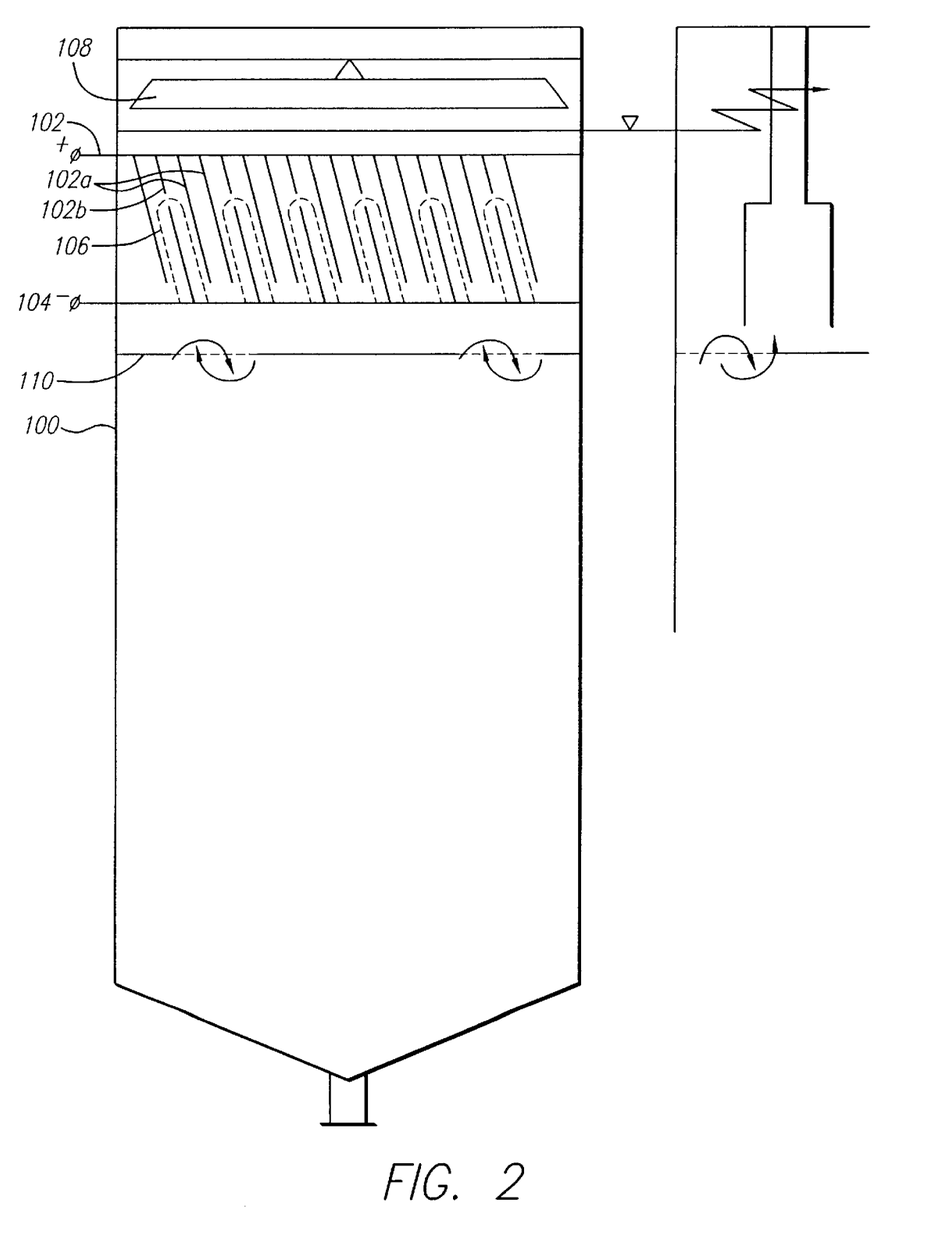
FIG. 2 is a diagrammatic view of a second embodiment of a reactor in accordance with the present invention.

With reference to FIG. 2 there is shown a reactor 100. The reactor 100 has an anode 102, a cathode 104 and a membrane 106. The anode 102 preferably comprises alternating long and short anodes 102a and 102b respectively, with a cathode 104 extending upwardly and partially between two long anodes 102a. The membrane 106 loops between the anodes and cathodes. A UV light source 108 is provided in the reactor 100. A perforated wall is shown at reference numeral 110.

Figure 3:
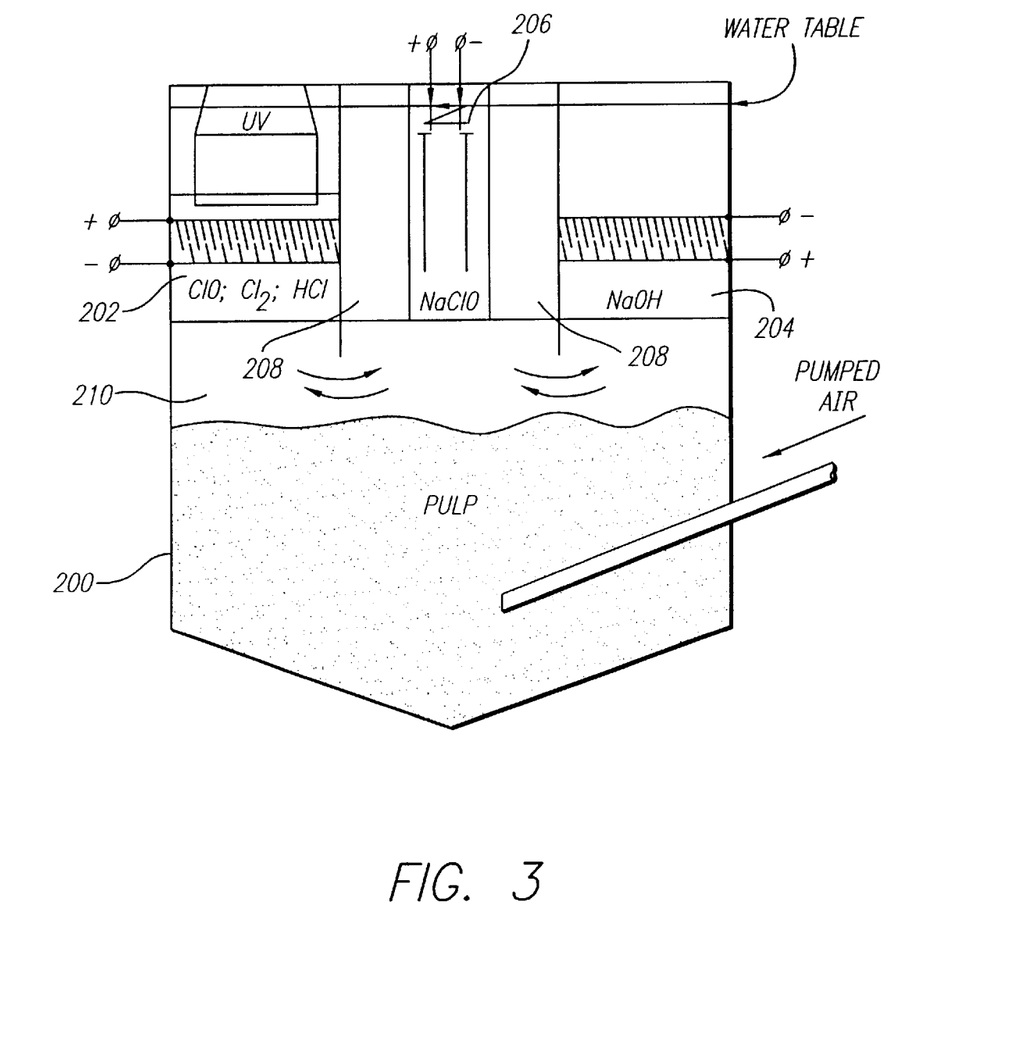
FIG. 3 is a diagrammatic view of a third embodiment of a reactor in accordance with the present invention.

With reference to FIG. 3, there is shown a leaching reactor 200 which is specially adapted to produce the acidic, basic and near neutral solutions, that are mixed in the lower part of the reactor. The reactor 200 has lateral compartments 202 and 204 including the anode, cathode and membrane as described with respect to the previous embodiments, as well as a UV light source. A centrally located compartment 206 includes the electrodes, but no membrane or UV light source. The acidic and basic solutions are produced in the lateral compartments 202 and 204, while the near neutral solution is produced in the central compartment 206.

With further reference to FIG. 1, it is seen that, in one embodiment, the anolytic (acidic) solution from electrolyzer 12 is conveyed to chamber 40. The corresponding anolytic solution from the second electrolizer 14 is transmitted to the same chamber 40. The catholytic solution from both the first electrolyzer 12 and the second electrolyzer 14 are both transmitted to chamber 42. Such conveyance occurs by convectional means through conduits shown by lines in FIG. 1, but which have not been specifically referenced.

With reference to FIG. 1, the third electrolyzer 16, which differs from the first and second electrolyzers 12 and 14 primarily by the absence of a membrane and the UV sources having the photoelectrolytic effect, produces the bi-electrolithic solution containing activated water, hypochlorites, NaClO, NaOH, $Cl_2$, HClO, OH, cation H and $H_3O$. The solution produced in the third electrolyzer 16 is conveyed to chamber 44.

In a preferred embodiment, the water molecules near the surfaces at the water-electrodes and water-reactor boundaries may be further activated by providing electrodes made of metallic grating. The electrodes are separated from the main volume of the electrolyzer by a perforated wall (see, for example, 110 in FIG. 2) in the lower part. The reactions occur in the upper (and smaller) compartment 34 of the electrolyzer (reactor) while in the lower compartment 36, ion exchange through convectional motion occurs. The reaction temperature within the electrolyzers may be varied for maximum yield and to reduce reaction time.

During leaching the main area (see, for example, 210 in FIG. 3) of the reactor can be stirred mechanically or by aeration to facilitate better contact of mineral particles with the solution, and increase the convection.

The electrodes within the electrolyzer are arranged to be parallel to each other and have an opposite orientation. This arrangement of the electrodes has the advantageous effect of allowing interorthogonal direction of ion flow, stabilized in a secondary magnetic field. Typically, a preferred voltage on the electrode is 2–60 volts, preferably 15–25 volts, while volume amperage is greater than 0.5 A/l. The treatment of the solution by ultraviolet light is to achieve a photoelectrolytic effect, and a >50 $\mu$W/cm$^2$ UV source is provided for about 15–30 minutes, while the electric and secondary magnetic fields still apply. On the electrodes, the ultraviolet photons affect the atoms of chlorine and oxygen. During treatment, the atoms do not create a bond with the same atoms in the electrode zone, but migrate from the electrode zone further into the solution. Additionally, O can combine with $O_2$ to create the $O_3$ (ozone) molecule, and this generally facilitates the process. In the bi-electrode zone, both the catholyte and the anolyte are produced simultaneously.

The electrodes should be located in blocks accessible by the UV light.

When treated with a UV light, the atoms of the electrodes, as well as the ions of Cl and O, rapidly exchange electrons. The fast electronic exchange process assists in significantly reducing the number of Cl and O atoms which form molecules. This photoelectrolytic effect on the electrodes, ensuring the constant producing of atomic Cl, O and $O_3$, and preventing the formation of $Cl_2$ and $O_2$ molecules, is a very important feature of this invention in the recovery of precious metals from ore.

During the entire UV treatment process, the whole amount of the solution is treated in the electrolyzer or reactor.

It has been noted that, for some ore types, photoelectrolysis can be substituted with radio-electrolysis, since, in certain circumstances, radio-electrolysis may have a preferred effect. The radioelectrolysis may constitute treatment of the electrode zone by $\alpha,\beta+$, $\beta-$ and $\gamma$ rays.

It has been mentioned above that sodium chloride is added to the electrolyzers 12, 14 and 16. NaCl crystals are added to the electrolyzer in small portions. The sodium chloride is added every 5–15 minutes over a period of about 1–2 hours. The final concentration of NaCl may be 0.n—n g/l where n is between 1 and 9. At the cathode, the following reaction will occur:

At the anode, the following reactions take place:

At the bi-electrode, the reaction is:

New agents may be added to the activated water during electrolysis, and then with the adding of NaCl and the simultaneous photoelectolysis (electrolysis with UV light treatment of the electrodes), the reaction proceeds. The concentration of the reagents will depend on the potential of the electrodes during electrolysis, amperage, the distance between electrodes and their area, intensity of UV light, and the original concentration of NaCl added to the solution. In one embodiment, the three solutions are mixed in approximately equal proportions so that a slurry of pH near 7 is produced.

Additional components may be added to the reactor during electrolysis or after completion thereof to improve the recovery process. Such components include the following: HCl, $H_2SO_4$, $HNO_3$, KOH, NaOH, $Ca(OH)_2$, $KMnO_4$, KCN, NaCN, $Ca(CN)_2$, iodine and bromine.

The transition of ions of chlorine and oxygen into the atomic state can be achieved by short term treatment thereof with the UV source. In traditional electrolysis, atoms of chlorine and oxygen form molecules as follows:

and

The molecules $Cl_2$ and $O_2$ do not enter into the reaction with gold and other precious metals. However, the ultraviolet photons transform molecular chlorine and oxygen into atomic chlorine and oxygen, and the neutral oxygen and chlorine atoms are active with respect to the atoms of gold and other precious metals.

Oxygen is a stronger oxidizer than chlorine, although it is not typically known for being able to produce complex ions such as $AuCl_4$. Thus, O and NaClO activate atoms of gold, but are unable to move these atoms into the solution. Additional Cl produces a complex with an atom of precious metal. It has been found that this complex is able to move into the solution, thus removing the gold atom from its location in the lattice of the ore mineral. The weak-acidic and weak-alkaline components provide ionic inequilibrity, and therefore create the possibility permitting more/than two ions to attract closely into the microspace.

Each of the solutions has a strong oxidizing power and complex-compound forming capacities. These properties correspond to the pH dynamics and certain local concentrations of oxidizers and complex-formers. For this reason, the conditions for applying the solutions to the corresponding ore types should be flexible.

The solutions used for the ore treatment before and after crushing and grinding have relatively low concentrations of reagents (0.n–ng/l). The leaching solutions have considerably higher concentrations (n–n*10 g/l). After treatment and crushing, some other reagents may be used for leaching, such as, for example, cyanides.

It is believed that interatomic interreactions with participation of complex-forming elements can be considered internuclear ones. We believe that the dissolution process is the result of interaction of local electric fields generated by atomic nuclei.

During crushing and grinding, the ore particle size and distances between surfaces and inner portions of particles decrease. Moreover, the energy of precious metal atoms isomorphically included in the lattice of crystals exponentially increases. If, in the pore space and micro-fractures, there are sources of micro-chargers additively equal to the charges of the atomic nuclei of the metals, the ions and atoms come close together in the moment of closing of the micro-fractures and pores. At this moment, atoms of the metals are believed to migrate to the surface.

Subsequent to the treatment of the ore with combination solutions, the ore may undergo a crushing and grinding process. This process favors the conditions under which microfractures are formed and filled in with the solutions that have a "completing" composition. This enables the ions to attract more actively when the microfractures are closed.

Either some portion of the ore can be processed with appropriate solutions, or the whole amount of the ore is processed with the three solutions, namely, the anolytic, catholytic and bi-electrode solution. In this way, the following ions are provided: cation H, ($H_3O$), OH, ClO, Na, as well as atomic O and atomic Cl. These latter two atoms are produced according to a reaction already described above. The type of solution used will depend on the genetic type of the ore, depending, for example, on the mineral and chemical composition, the grain size, grain shape etc. of the ore from which the precious metal is to be extracted. Low concentrations of ions such as Na, Cl, ClO, where concentrations may be 0.n–ng/l, the extent to which the ions form hydrate shells, and the equality of charges Na (11)←−3H(1) O(18)Cl(17)←−2O(8)H(1) provide a strong effect of the atoms of gold. All of these effects result in an economically and ecologically favorable process.

The final recovery after crushing and grinding, which may comprise wet or dry processes, involves leaching by one or more, or a combination, of the solutions. The solutions at this time have a higher concentration than the relatively low concentration in the initial use. Smelting or amalgamation after treatment would also be a suitable method of recovering the precious metal, if the concentration of the precious metal in the ore is sufficient. Finally, the process of concentration and refinery of metals follows.

Leaching may be combined with sorption, extraction, electrowinning, amalgamation, and cementation in special sections of the bi-electrode compartment (see, for example, 208 in FIG. 3). Electrosorption is a combination of sorption and cathode electrowinning in a common space in the reactor.

We claim:

1. A process for making a composition for use in recovering precious metals, the process comprising:
    (a) activating water by subjecting it to a magnetic treatment;
    (b) subjecting the water to electrolysis in a reactor having an electrode;
    (c) introducing an additive into the activated water in the reactor to form a reaction mixture;
    (d) subjecting the reaction mixture to photoelectrolysis, wherein the electrode is treated with ultraviolet light during electrolysis; and
    (e) separating an anolyte and a catholyte in the reactor.

2. The process as claimed in claim 1, wherein the electrode comprises an anode and a cathode in the reactor, and wherein the anode and the cathode are separated by a membrane.

3. The process as claimed in claim 2, wherein the anode and cathode are comprised of metallic grating.

4. The process as claimed in claim 2, wherein the anode and cathode are located parallel and opposite to each other to facilitate ion flow.

5. The process as claimed in claim 1, wherein the electrode comprise an anode and a cathode in the reactor, and wherein the anode and the cathode falls within a range of 2–60 volts.

6. The process as claimed in claim 1, wherein the electrode comprises an anode and a cathode in the reactor, and wherein volume amperage on the anode and the cathode is greater than 0.5 A/l (amperes per liter).

7. The process as claimed in claim 1, wherein the additive comprises NaCl.

8. The process as claimed in claim 7, wherein the sodium chloride in a crystalline form is added to the reactor in small portions after the electrolysis of the water in step (b) is substantially complete.

9. The process as claimed in claim 1, wherein the reaction mixture is subjected to an ultraviolet light source while electrolysis is still applied.

10. The process as claimed in claim 9, wherein the ultraviolet light source comprises an at least 50 $\mu W/cm^2$ ultraviolet light source.

11. The process as claimed in claim 9, where the electrode comprises an anode and a cathode in the reactor, and wherein the anode and cathode are located in the reactor in blocks which are accessible to the ultraviolet light.

12. The process as claimed in claim 9, wherein the ultraviolet light source comprises a quartz lamp.

13. The process as claimed 1 further comprising subjecting the reaction mixture to radioelectrolysis.

14. A process as claimed in claim 13, wherein radioelectrolysis is a process comprising electrolysis and treatment by alpha rays, beta rays, gamma rays, and gluon rays.

15. The process as claimed in claim 1, wherein the activated water is subjected to electrolysis to produce a semi-neutral or bi-electrolithic solution.

16. The process as claimed in claim 15, wherein the semi-neutral solution consists of one or more of the following: hypochlorites, sodium hypochlorite, sodium hydroxide, atomic Cl, $Cl_2$, or a mixture of two or more thereof.

17. A process as claimed in claim 15, wherein electrolysis is combined with shock-spark electrolysis.

18. A process as claimed in claim 15, wherein a material is treated by leaching with one or more of the solutions selected from the group consisting of the anolyte, the catholyte, and the semi-neutral solution.

19. A process as claimed in claim 18, wherein the material is treated by leaching with conventionally known reagents.

20. A semi-neutral solution made by the process claimed in claim 15.

21. The process as claimed in claim 1, wherein the anolyte is an acidic solution having a pH of less than 7, and wherein the anolyte consists of one or more of the following: HCl, O, $O_2$, $O_3$, atomic Cl, anion, $Cl_2$, $O_3$, $H_3O$, $H_2O_2$, or a mixture of two or more thereof.

22. The process as claimed in claim 1, wherein the catholyte is a basic solution having a pH of more than 7, wherein the catholyte consists of one or more of the following: sodium hydroxide NaOH, hydroxyl ions $OH^-$, anions Cl, complex anions $O_2H$, or a mixture of two or more thereof.

23. The process as claimed in claim 1, wherein in step (a) the water is subjected to a magnetic field with a potential equal to or greater than 100 m Tesla prior to introduction of the water into the reactor.

24. The process as claimed in claim 1, wherein the water moves in conduits between a source and the reactor at a velocity of at least 0.3 meters per second.

25. The process as claimed in claim 1, wherein the water in step (b) is subjected to an electric field in the reactor for more than 3 minutes.

26. A process as claimed in claim 1, wherein the photoelectrolysis is a process comprising electrolysis and treatment by ultraviolet light.

27. A process as claimed in claim 1, wherein activation of the water takes place in a separate area of the reactor separated from a main volume thereof by perforated walls, and activated solution is replaced through convectional motion.

28. A process as claimed in claim 1, further comprising recovering a precious metal by means of sorption, extraction, electrowinning, ion-exchange, amalgamation, electrosorption, or cementation.

29. A process as claimed 28, wherein electrosorption is a combination of sorption and electrowinning in the reactor.

30. A process as claimed in claim 1, wherein the additive comprises NaCl, HCl, $H_2SO_2$, $HNO_3$, KOH, NaOH, $Ca(OH)_2$, $KMnO_4$, KCN, NaCN, $Ca(CN)_2$, iodine, bromine, or a mixture of two or more thereof.

31. A process as claimed in claim 1, wherein the anolyte and the catholyte are combined.

32. A process as claimed in claim 1, wherein step (d) comprises treating the reaction mixture with ultraviolet light.

33. An anolyte made by the process claimed in claim 1.

34. A catholyte made by the process claimed in claim 1.

35. A process for making a composition for use in recovering precious metals, the process comprising:
(a) activating water;
(b) introducing an additive into the activated water to form a reaction mixture;
(c) subjecting the reaction mixture in a reactor to photoelectrolysis, wherein the reactor has an electrode for electrolysis, and wherein during the photoelectrolysis of the reaction mixture the electrode is treated with ultraviolet light during electrolysis; and
(e) separating an anolyte and a catholyte in the reactor.

36. A process as claimed in claim 35, wherein step (a) comprises one or more of the following steps: (i) treating the water with a magnetic field; (ii) treating the water with ultraviolet light; (iii) or treating the water with an electric field.

37. A process as claimed in claim 35, wherein the electrode comprises an anode and a cathode in the reactor, and wherein the anode and the cathode are separated by a membrane.

38. A process as claimed in claim 35, wherein the electrode comprises an anode and a cathode in the reactor, and wherein the anode and the cathode are comprised of a metallic grating.

39. A process as claimed in claim 35, wherein the electrode comprises an anode and a cathode in the reactor, and wherein voltage on the anode and the cathode falls within a range of 2–60 volts.

40. A process as claimed in claim 35, wherein the electrode comprises an anode and a cathode in the reactor, and wherein volume amperage on the anode and the cathode is greater than 0.5 A/l (amperes per liter).

41. A process as claimed in claim 35, wherein photoelectrolysis of the reaction mixture comprises subjecting the reaction mixture to an ultraviolet light source while subjecting the reaction mixture to electrolysis.

42. A process as claimed in claim 41, wherein the ultraviolet light source comprises an at least 50 $\mu W/cm^2$ ultraviolet light source.

43. The process as claimed in claim 35, further comprising subjecting the reaction mixture to radioelectrolysis.

44. A process as claimed in claim 35, wherein the activated water is subjected to electrolysis to produce a semi-neutral or bi-electrolithic solution.

45. A semi-neutral solution made by the process claimed in claim 44.

46. A process as claimed in claim 35, wherein the anolyte is an acidic solution having a pH of less than 7, and wherein the anolyte comprises one or more of the following: HCl, O, $O_2$, $O_3$, atomic Cl, anion, $Cl_2$, $O_3$, $H_3O$, $H_2O_2$, or a mixture of two or more thereof.

47. A process as claimed in claim 35, wherein the catholyte is a basic solution having a pH of more than 7, wherein the catholyte comprises one or more of the following: sodium hydroxide NaOH, hydroxyl ions $OH^-$, anions Cl, complex anions $O_2H$, or a mixture of two or more thereof.

48. A process as claimed in claim 35, wherein the semi-neutral solution comprises one or more of the following: hypochlorites, sodium hypochlorite, sodium hydroxide, atomic Cl, $Cl_2$, or a mixture of two or more thereof.

49. A process as claimed in claim 35, wherein the water is activated in step (a) by subjecting the water to a magnetic field with a potential equal to or greater than 100 m Tesla.

50. A process as claimed in claim 35, wherein the additive comprises NaCl, HCl, $H_2SO_2$, $HNO_3$, KOH, NaOH, $Ca(OH)_2$, $KMnO_4$, KCN, NaCN, $Ca(CN)_2$, iodine, bromine, or a mixture of two or more thereof.

51. An anolyte made by the process claimed in claim 35.

52. A catholyte made by the process claimed in claim 35.

* * * * *